United States Patent Office 3,336,332
Patented Aug. 15, 1967

3,336,332
METHOD FOR PREPARING HALOMETHYL SUBSTITUTED PHTHALOCYANINE SULFONIC ACID COMPOUNDS
Charles W. C. Stein, Westfield, and Peter Drenchko, Belle Mead, N.J., assignors to General Aniline & Film Corporation, New York, N.Y., a corporation of Delaware
No Drawing. Filed May 12, 1964, Ser. No. 366,904
4 Claims. (Cl. 260—314.5)

The present invention relates to a method for preparing halomethylated phthalocyanine sulfonic acid derivatives and more specifically to a method for preparing metal-free and metal-substituted and unsubstituted phthalocyanine sulfonic acid derivatives containing from one to 3 halomethyl substituents and from one to 3 sulfonic acid substituents.

Halomethyl-substituted phthalocyanine sulfonic acid compounds find utility in the dyestuff industry and, in particular, are useful as intermediates in the preparation of valuable dyes, pigments and compositions containing same. Techniques for effecting the halomethylation of metal and metal-free phthalocyanines and their derivatives are available in the prior art. Such previously known halomethylation processes generally entail the utilization of a reaction of the phthalocyanine starting material with a bis-halo-methyl ether or a substance capable of forming a bis-ether in aluminum chloride and the like with or without an inert tertiary amine, as exemplified by the methods disclosed in U.S. Patents Nos. 2,435,307 and 2,795,584. Numerous sulfonation methods also are known for introducing sulfonic acid substituents into the nucleus of phthalocyanine derivatives. Heretofore it has been attempted to prepare halomethyl phthalocyanine sulfonic acid compounds by a combination of such known halomethylation and sulfonation techniques in a two-step process. These previous attempts, however, have met with little or no success in achieving a satisfactory yield of the desired halomethyl and sulfonic acid-substituted products.

In embodiments of such prior art two-step methods an initial introduction of sulfonic acid groups into the phthalocyanine starting material unsatisfactorily has significantly hindered a subsequent attempt to halomethylate the resulting phthalocyanine sulfonic acid intermediate with the result that usually it has been extremely difficult to provide a final product having the desired degree of halomethylation and sulfonation with any predictability, and the requisite condition control expenditures and the relatively low yields obtained have rendered such an approach economically unfeasible. Other embodiments in which it has been attempted to effect halomethylation prior to sulfonation likewise have not been completely suitable due to the fact that the halomethyl-substituted intermediate decomposes at the conditions employed in the sulfonation step and sulfonation frequently occurs at positions other than on the phthalocyanine nucleus.

Accordingly, it is the primary object of the present invention to provide a relatively simple and economical process for preparing halomethyl phthalocyanine sulfonic acid compounds.

It is another object of the present invention to provide a process for preparing halomethyl phthalocyanine sulfonic acid compounds wherein significantly higher yields are obtained than in techniques heretofore available.

A further object of the present invention is to provide a method for preparing halomethyl phthalocyanine sulfonic acid compounds wherein products having the desired degree of halomethylation and sulfonation may be obtained at relatively high predictability levels.

Still an additional object of the present invention is to provide an efficient process for preparing halomethyl phthalocyanine sulfonic acid compounds which requires the utilization of a relatively simple reactant system free of extraneous catalytic materials.

A particular object of the present invention is to provide a process for the preparation of halomethyl phthalocyanine sulfonic acid compounds wherein the desired halomethylation and sulfonation of a phthalocyanine starting material are carried out simultaneously in a single-step operation with relatively high yields of a product having a predicted number of halomethyl and sulfonic acid groups being obtained.

Broadly described, the present invention provides a method for preparing halomethyl-substituted phthalocyanine sulfonic acid compounds which comprises reacting a phthalocyanine starting material selected from the group consisting of a metal-free phthalocyanine and a metal phthalocyanine with a halomethylating agent of the formula R—O—CH$_2$X wherein R is selected from the group consisting of lower alkyl (i.e., methyl, ethyl, propyl, isopropyl, n-butyl, etc.), —CH$_2$X, and —CH$_2$—R$_1$, wherein R$_1$ is selected from the group consisting of lower alkoxy (i.e., methoxy, ethoxy, butoxy, etc.) and —OCH$_2$X and X is halogen (i.e., chloro, bromo, iodo, and fluoro) in the presence of an acid selected from the group consisting of (a) chlorosulfonic acid and (b) from about 5% to about 65% oleum for a time period requisite to provide a phthalocyanine product containing at least one halomethyl substituent and at least one sulfonic acid substituent.

Phthalocyanine compounds contemplated for utilization as starting materials in the method of the present invention include metal-free phthalocyanine derivatives and metal phthalocyanines including, for example, copper, cobalt, nickel and iron phthalocyanine compounds. Phthalocyanine starting materials which contain inert substituents such as alkyl, alkoxy, aryl, halo, and the like (i.e., methyl, ethyl, butyl, methoxy, ethoxy, phenyl, tolyl, chloro, bromo, etc.) also are contemplated for use but generally are less reactive and thus are less preferred.

The halomethylating agent employed in the present method may be added to the reaction mixture or formed in situ. Examples of suitable halomethylating agents which can be added to the reaction mixture include, without limitation, chloromethyl methyl ether, bromomethyl methyl ether, iodomethyl methyl ether, fluoromethyl methyl ether, chloromethyl ethyl ether, bromomethyl propyl ether, chloromethyl butyl ether, bis-chloromethyl ether, bis-bromomethyl ether, bis-iodomethyl ether, chloromethoxy methoxy methane, bis-chloromethoxy methane, bis-bromomethoxy methane, chloromethoxy ethoxy methane, bromomethoxy butoxy methane, etc. Halomethylating agents contemplated for utilization in the invention which are formed, in situ, include the corresponding reagents formed by the interaction of anhydrous hydrogen halide such as hydrogen chloride, hydrogen bromide and the like with a material such as formaldehyde, paraformaldehyde and methylal in the presence of sulfuric acid, oleum and chlorosulfonic acid. The halomethylating agents preferred for use are the bis-halomethyl ethers.

In accordance with the method of the invention, products having a ratio of halomethyl groups to sulfonic acid groups in the range of 3:1 to 1:1, e.g., trihalomethyl phthalocyanine monosulfonic acid, dihalomethyl phthalocyanine monosulfonic acid and dihalomethyl phthalocyanine disulfonic acid are prepared by using 5 to 65% oleum in combination with the halomethylating agent. Oleum concentrations of from about 5 to 15% favor the production of trihalomethyl monosulfonic acid derivatives. From about 15 to about 35% oleum is used to prepare the dihalomethyl monosulfonic acid derivatives and oleum having a concentration in the range of from about 35% to about 65% oleum provides the dihalomethyl disulfonic acid compounds. The use of oleum concentrations around the upper and lower limits of these ranges results in mixtures of the corresponding halomethylated sulfonic acid derivatives.

Although the relative proportions of oleum to the phthalocyanine starting material suitably may vary over wider ranges, the oleum reactant usually is employed in excess, preferably to provide a mol ratio of $SO_3$ in the oleum to phthalocyanine starting material in the range of from about 5:1 to about 15:1.

The proportion of the halomethylating agent to phthalocyanine starting material also may vary over a wide range. Usually the amount of halomethylating employed is such to provide a mol excess of —$CH_2X$ groups and preferably a mol ratio of —$CH_2X$ to phthalocyanine starting material in the range of from about 8:1 to about 20:1.

In such embodiments of the invention wherein chlorosulfonic acid is employed, derivatives containing ratios of halomethyl groups to sulfonic acid groups of 1:2 and 1:3 may be obtained, e.g., monohalomethyl phthalocyanine disulfonic acid and monohalomethyl phthalocyanine trisulfonic acid. The relative amount of chlorosulfonic acid employed usually is such as to provide a large excess of the chlorosulfonic acid reactant with the use of mol ratios of chlorosulfonic acid to phthalocyanine reactant in the range of from about 20:1 to about 60:1 being preferred.

The order of addition of the phthalocyanine starting material, acid reactant, i.e., oleum or chlorosulfonic acid, and halomethylating agent or materials capable of forming the halomethylating agent is not critical. Preferably the phthalocyanine starting compound initially is added to the oleum or chlorosulfonic acid, whichever is utilized, with a slight heating and then the halomethylating agent or halomethylating agent-forming materials subsequently are incorporated into the resulting mixture.

Halomethylation and sulfonation of the phthalocyanine starting compound present in the reactant systems, prepared in accordance with the method of the invention, are then carried out by heating the resultant system at a temperature usually above about 40° C., preferably in the range of from about 60 to about 120° C., for a time period requisite to obtain the desired halomethyl phthalocyanine sulfonic acid products. The actual time period required in particular embodiments of the invention varies in each instance depending upon, inter alia, the particular phthalocyanine starting material, acid, halomethylating agent and temperature utilized. At the above indicated temperature ranges, time periods in the range of about one to about 40 hours usually are sufficient, with from about 12 to about 24 hours constituting the preferred range.

The halomethylated phthalocyanine sulfonic acid products, prepared in accordance with the present method, suitably may be recovered from the resultant product-containing mixture by any conventional technique. For example, the products in the systems obtained in the reaction may be recovered in a satisfactorily pure form by a technique which entails initially adding the crude product mixture to ice water in which sodium chloride or potassium chloride is dissolved to form a crude product precipitate, recovering the precipitated product by filtration, washing the product solids free of acid with a cold sodium chloride or potassium chloride solution, and drying the resulting washed product.

The method of the invention having been fully described, the following examples are given to show specific embodiments thereof. It will be understood that the examples are given for illustration purposes only and not by way of limitation. Unless otherwise indicated the proportions given in the examples are on a weight basis.

*Example 1*

About 26 parts of 100% sulfuric acid were mixed with about 79 parts of 20% oleum to provide about 15% oleum. To the oleum about 10 parts of copper phthalocyanine were then added slowly, maintaining the temperature of the mixture obtained at about 25–30° C. After the addition was completed the resulting mixture was stirred for about one hour, and then about 16 parts of bis-chloromethyl ether were added at 25–30° C. The mixture thereby obtained was then heated slowly to a temperature of about 90° C. and then maintained at about 90° C. for about 24 hours. At the end of this time period the reaction mixture was cooled to about 20–30° C. and then poured slowly into a solution of about 3 parts of sodium chloride in about 400 parts ice water, whereby a product precipitant was formed. The precipitant-containing suspension was thoroughly stirred and then filtered. The filtered product was washed with a cold sodium chloride solution until acid-free and then dried in a vacuum at about 50–60° C. An analysis revealed the product thereby obtained to be a mixture containing principally dichloromethyl copper phthalocyanine monosulfonic acid and some trichloromethyl copper phthalocyanine monosulfonic acid, which product was soluble in water and basic solutions.

*Example 2*

About 10 parts copper phthalocyanine were added slowly to about 100 parts of 20% oleum, maintaining the temperature of the resulting mixture between about 25 and 30° C. The resultant mixture was stirred for about one hour and then about 20 parts of bis-chloromethyl ether were added at about 25–30° C. The mixture obtained was slowly heated to about 90° C. and then maintained at this temperature for about 24 hours. Thereafter the reaction mixture was cooled to about 35–40° C. and then poured slowly into about 400 parts of a dilute sodium chloride solution in ice water whereupon a crude product precipitate was formed. The precipitate was recovered by filtering, thereafter washed with a 5% sodium chloride solution until nearly neutral, then neutralized wtih sodium bicarbonate and finally dried, initially in a steam bath and then in a vacuum. The product thereby obtained contained sodium chloride and a mixture of dichloromethyl copper phthalocyanine monosulfonic acid and dichloromethyl phthalocyanine disulfonic acid.

*Example 3*

The procedure of Example 1 was repeated with the exceptions of substituting each, in turn, phthalocyanine, nickel phthalocyanine, cobalt phthalocyanine, and iron phthalocyanine for the copper phthalocyanine. In each case the results obtained were similar to those indicated in Example 1.

*Example 4*

The procedure of Example 1 was repeated with the exception of substituting bis-bromomethyl ether for the bis-chloromethyl ether. The product obtained was a mixture of dibromomethyl copper phthalocyanine monosulfonic acid and tribromomethyl copper phthalocyanine monosulfonic acid with the former predominating.

*Example 5*

The procedure of Example 2 was repeated with the exception of substituting bis-bromomethyl ether for the bis-chloromethyl ether. An analysis indicated the product obtained was a mixture of dibromomethyl copper phthalocyanine monosulfonic acid and dibromomethyl copper phthalocyanine disulfonic acid.

*Example 6*

About 10 parts of copper phthalocyanine were added slowly to about 100 parts of chlorosulfonic acid while keeping the temperature of the resulting mixture between about 25 and 30° C. After the addition was completed about 11 parts of bis-chloromethyl ether were added to the resulting mixture at about 25–30° C. The mixture thereby obtained was stirred for about one hour, then heated to about 90° C. and maintained at this temperature for about 30 hours. At the end of this time period the resultant reaction mass initially was cooled to about 30–35° C. and then poured slowly into about 400 parts of ice water with stirring. The resulting mixture was stirred for about 2 hours and the precipitate which formed was removed by filtering, washed free of acid with a potassium chloride solution and then dried in a vacuum at about 50–60° C. The product thereby obtained was principally monochloromethyl copper phthalocyanine trisulfonic acid.

*Example 7*

The procedure of Example 6 was repeated with the exceptions of substituting each, in turn, phthalocyanine, nickel phthalocyanine, cobalt phthalocyanine and iron phthalocyanine for the copper phthalocyanine. The results obtained in each case were similar to those obtained in Example 6.

*Example 8*

The procedure of Example 6 was repeated with the exception of substituting bis-bromomethyl ether for the bis-chloromethyl ether. The product obtained was chiefly monobromomethyl copper phthalocyanine trisulfonic acid.

It is to be understood that the foregoing detailed description is given merely by way of illustration and that many variations may be made therein without departing from the spirit of this invention.

What is claimed is:

1. A method for preparing halomethyl-substituted phthalocyanine sulfonic acid compounds which comprises reacting a phthalocyanine starting material selected from the group consisting of a metal-free phthalocyanine and a metal phthalocyanine with a halomethylating agent of the formula R—O—$CH_2$X wherein R is selected from the group consisting of lower alkyl, —$CH_2$X, and —$CH_2$—$R_1$; wherein $R_1$ is selected from the group consisting of lower alkoxy and —O$CH_2$X; and X is halogen in the presence of chlorosulfonic acid, the mol ratio of chlorosulfonic acid to phthalocyanine reactant being in the range of from about 20:1 to 60:1, at a temperature in the range of from about 40° C. to about 120° C. for a time period in the range of from about one to forty hours, thereafter recovering a product containing at least one halomethyl group and from two to three sulfonic acid groups.

2. A method for preparing halomethyl-substituted phthalocyanine sulfonic acid compounds which comprises reacting a phthalocyanine starting material selected from the group consisting of a metal-free phthalocyanine and a metal phthalocyanine with a halomethylating agent of the formula R—O—$CH_2$X wherein R is selected from the group consisting of lower alkyl, —$CH_2$X, and —$CH_2$—$R_1$; wherein $R_1$ is selected from the group consisting of lower alkoxy and —O$CH_2$X; and X is halogen in the presence of about 5 to about 15% oleum, the mol ratio of oleum to phthalocyanine reactant being in the range of from about 5:1 to about 15:1, at a temperature in the range of from about 40° C. to about 120° C. for a time period in the range of from about one to forty hours, thereafter recovering a trihalomethyl monosulfonic acid derivative.

3. A method for preparing halomethyl-substituted phthalocyanine sulfonic acid compounds which comprises reacting a phthalocyanine starting material selected from the group consisting of a metal-free phthalocyanine and a metal phthalocyanine with a halomethylating agent of the formula R—O—$CH_2$X wherein R is selected from the group consisting of lower alkyl, —$CH_2$X, and —$CH_2$—$R_1$; wherein $R_1$ is selected from the group consisting of lower alkoxy and —O$CH_2$X; and X is halogen in the presence of about 15 to about 35% oleum, the mol ratio of oleum to phthalocyanine reactant being in the range of from about 5:1 to about 15:1, at a temperature in the range of from about 40° C. to about 120° C. for a time period in the range of from about one to forty hours, thereafter recovering a dihalomethyl monosulfonic acid derivative.

4. A method for preparing halomethyl-substituted phthalocyanine sulfonic acid compounds which comprises reacting a phthalocyanine starting material selected from the group consisting of a metal-free phthalocyanine and a metal phthalocyanine with a halomethylating agent of the formula R—O—$CH_2$X wherein R is selected from the group consisting of lower alkyl, —$CH_2$X, and —$CH_2$—$R_1$; wherein $R_1$ is selected from the group consisting of lower alkoxy and —O$CH_2$X; and X is halogen in the presence of about 35 to about 65% oleum, the mol ratio of oleum to phthalocyanine reactant being in the range of from about 5:1 to about 15:1, at a temperature in the range of from about 40° C. to about 120° C. for a time period in the range of from about one to forty hours, thereafter recovering a dihalomethyl disulfonic acid derivative.

References Cited

UNITED STATES PATENTS

| 2,547,972 | 4/1951 | Randall et al. | 260—314.5 |
| 3,023,218 | 2/1962 | Tartter | 260—314.5 |
| 3,065,092 | 11/1962 | Geiger et al. | 260—314.5 |
| 3,091,618 | 5/1963 | Fleysher et al. | 260—314.5 |

FOREIGN PATENTS

| 689,153 | 3/1953 | Great Britain. |

WALTER A. MODANCE, *Primary Examiner.*

JAMES A. PATTEN, *Assistant Examiner.*